US008549296B2

(12) United States Patent
Driscoll

(10) Patent No.: US 8,549,296 B2
(45) Date of Patent: Oct. 1, 2013

(54) SIMPLE AUTHENTICATION OF MESSAGES

(75) Inventor: Kevin Raymond Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1129 days.

(21) Appl. No.: 12/276,168

(22) Filed: Nov. 21, 2008

(65) Prior Publication Data

US 2009/0138712 A1 May 28, 2009

Related U.S. Application Data

(60) Provisional application No. 60/990,911, filed on Nov. 28, 2007.

(51) Int. Cl.
*H04L 9/32* (2006.01)
*H04L 29/06* (2006.01)

(52) U.S. Cl.
USPC .......... 713/170; 713/150; 713/168; 713/171; 713/172

(58) Field of Classification Search
USPC .............................. 713/168, 170–185; 726/30
See application file for complete search history.

(56) References Cited

U.S. PATENT DOCUMENTS

| | | | | |
|---|---|---|---|---|
| 6,230,268 B1 * | 5/2001 | Miwa et al. | ............ | 713/176 |
| 6,442,617 B1 * | 8/2002 | Lowe et al. | ............ | 709/250 |
| 6,760,440 B1 | 7/2004 | Driscoll | ............ | 380/37 |
| 6,763,363 B1 | 7/2004 | Driscoll | ............ | 708/252 |
| 6,804,354 B1 | 10/2004 | Driscoll | ............ | 380/28 |
| 6,968,456 B1 * | 11/2005 | Tripathi et al. | ............ | 713/185 |
| 7,277,543 B1 | 10/2007 | Driscoll | ............ | 380/43 |
| 7,366,170 B2 * | 4/2008 | Umesawa et al. | ............ | 370/389 |
| 7,552,467 B2 * | 6/2009 | Lindsay | ............ | 726/5 |
| 7,594,114 B2 * | 9/2009 | Hooker et al. | ............ | 713/170 |
| 7,730,305 B2 * | 6/2010 | Eun et al. | ............ | 713/168 |
| 7,747,801 B2 * | 6/2010 | Han et al. | ............ | 710/106 |
| 7,827,182 B1 * | 11/2010 | Panigrahy | ............ | 707/747 |
| 7,831,606 B2 * | 11/2010 | Pandya | ............ | 707/758 |
| 7,882,358 B2 * | 2/2011 | Hughes et al. | ............ | 713/176 |
| 8,209,536 B2 * | 6/2012 | Yao | ............ | 713/170 |
| 2002/0002678 A1 * | 1/2002 | Chow et al. | ............ | 713/169 |
| 2007/0005955 A1 * | 1/2007 | Pyle et al. | ............ | 713/156 |
| 2007/0130472 A1 * | 6/2007 | Buer et al. | ............ | 713/182 |
| 2007/0133591 A1 * | 6/2007 | Shatford | ............ | 370/457 |
| 2007/0250920 A1 * | 10/2007 | Lindsay | ............ | 726/7 |
| 2008/0059590 A1 * | 3/2008 | Sarafijanovic et al. | ............ | 709/206 |
| 2008/0168543 A1 * | 7/2008 | von Krogh | ............ | 726/6 |
| 2008/0240447 A1 * | 10/2008 | Zhu et al. | ............ | 380/279 |

OTHER PUBLICATIONS

Perrig, Adrian et al., "SPINS: Security Protocols for Sensor Networks", Department of Electrical Engineering and Computer Sciences University of California, Berkeley (2001).

(Continued)

*Primary Examiner* — Saleh Najjar
*Assistant Examiner* — Feliciano Mejia
(74) *Attorney, Agent, or Firm* — Fogg & Powers LLC

(57) ABSTRACT

Methods and systems for using simple authenticated messages are disclosed for use with implementing (i) synchronization schemes, (ii) encoded control messaging schemes, and (iii) encrypted data communication schemes. Messages are authenticated by applying a secure hash function to one or more authentication tokens to produce hash results which are compared to stored trusted bit strings, wherein the stored trusted bit strings are replaced with the most-recently received authentication token whose corresponding hash result matched the stored bit string.

20 Claims, 4 Drawing Sheets

(56) References Cited

OTHER PUBLICATIONS

Perrig, Adrian et al., "The TESLA Broadcast Authentication Protocol", pp. 1-11.
B. Weis et al., "Multicast Extensions to the Security Architecture for the Internet Protocol," draft-ietf-msec-ipsec-extensions-09.txt (Jun. 6, 2008).
V. Roca et al., "Use of TESLA in the ALC and NORM Protocols," draft-ietf-msec-tesla-for-alc-norm-06.txt (Oct. 22, 2008).
D. McGrew et al., "Using Counter Modes with Encapsulating Security Payload (ESP) and Authentication Header (AH) to Protect Group Traffic," draft-ietf-msec-ipsec-group-counter-modes-02 (Jun. 9, 2008).
M. Baugher et al., "The Group Domain of Interpretation," IETF Network Working Group, RFC 3547 (Jul. 2003).
T. Hardjono et al., "The Multicast Group Security Architecture," IETF Network Working Group, RFC 3740 (Mar. 2004).
J. Arkko et al., "MIKEY: Multimedia Internet KEYing," IETF Network Working Group, RFC 3830 (Aug. 2004).
M. Baugher et al., "Multicast Security (MSEC) Group Key Management Architecture," IETF Network Working Group, RFC 4046 (Apr. 2005).
A. Perrig et al., "Timed Efficient Stream Loss-Tolerant Authentication (TESLA): Multicast Source Authentication Transform Introduction," IETF Network Working Group, RFC 4082 (Jun. 2005).
B. Weis, "The Use of RSA/SHA-1 Signatures within Encapsulating Security Payload (ESP) and Authentication Header (AH)," IETF Network Working Group, RFC 4359 (Jan. 2006).
M. Baugher et al., "The Use of Timed Efficient Stream Loss-Tolerant Authentication (TESLA) in the Secure Real-time Transport Protocol (SRTP)," IETF Network Working Group, RFC 4383 (Feb. 2006).
S. Fries et al., "Bootstrapping Timed Efficient Stream Loss-Tolerant Authentication (TESLA)," IETF Network Working Group, RFC 4442 (Mar. 2006).
H. Harney et al., "GSAKMP: Group Secure Association Key Management Protocol," IETF Network Working Group, RFC 4535 (Jun. 2006).
A. Colegrove et al., "Group Security Policy Token v1," IETF Network Working Group, RFC 4534 (Jun. 2006).
E. Carrara et al, "The Key ID Information Type for the General Extension Payload in Multimedia Internet KEYing (MIKEY)," IETF Network Working Group, RFC 4563 (Jun. 2006).
M. Euchner, "HMAC-Authenticated Diffie-Hellman for Multimedia Internet KEYing (MIKEY)," IETF Network Working Group, RFC 4650 (Sep. 2006).
D. Ignajatic et al., "MIKEY-RSA-R: An Additional Mode of Key Distribution in Multimedia Internet KEYing (MIKEY)," IETF Network Working Group, RFC 4738 (Nov. 2006).
S. Fries et al., "On the Applicability of Various Multimedia Internet KEYing (MIKEY) Modes and Extensions," IETF Network Working Group, RFC 5197 (Jun. 2006).
N. Haller, "The S/KEY One-Time Password System," IETF Network Working Group, RFC 1760 (Feb. 1995).

\* cited by examiner

_(12)_ United States Patent
US 8,549,296 B2

SIMPLE AUTHENTICATION OF MESSAGES

PRIORITY CLAIM

The present application claims priority to U.S. provisional application 60/990,991 filed on Nov. 28, 2007, the entirety of which is hereby incorporated by reference.

SIMPLE AUTHENTICATION OF MESSAGES

Known methods of message authentication include the use of Message Authentication Codes and Public Key Encryption. Neither of these authentication methods is desirable for embedded, real-time control systems that often use unicast, broadcast, or multicast transmission. First, authentication schemes using Message Authentication Codes require all message recipients to share a common secret and are therefore undesirable because the entire control system can be compromised if only one of the receiving devices is compromised. This poses a problem when receiving devices are not physically guarded. Second, authentication schemes relying on Public Key Encryption are undesirable because they are computationally intensive and therefore not well suited for embedded, real-time control systems. This poses a problem when the receiving device has very meager computation and communication resources. Thus, there is a need for secure, fast, and low cost authentication methods which can be implemented by receiving devices to authenticate the source of a unicast, broadcast, or multicast transmission.

OVERVIEW

Systems and methods for simple authentication of unicast, broadcast, and/or multicast messages are disclosed where a recipient authenticates the sender of a message transmission such that no unauthorized entity can send a forged transmission alleged to have come from the authentic source. In the disclosed systems and methods, the sender and recipients need not share secrets, and thus, the compromise of any one receiver does not endanger the entire network, as would be the case for Message Authentication Codes. Also, the disclosed systems and methods use a secure (one-way) hash function for message authentication, and thus, require much less computation, memory, and bandwidth to implement as compared to public key cryptography.

An initial trusted bit string can be created and distributed to all possible recipients of the message. The initial trusted bit string is created by N applications of the hash function to an original secret random bit string, where N can be very large or small depending on the desired application. Creation of such an initial trusted bit string is known in the art and described in RFC 1760, which is hereby incorporated herein by reference. This initial trusted bit string can be distributed to the recipients at the point of manufacture, at the time of installation, or at other times via secure methods that provide trusted authentication of messages (secrecy is not needed). Trust can be placed in this initial trusted bit string by conventional means such as by using a physically-trusted communication channel (e.g., a hard-wired physical connection), using public key cryptography, using symmetric cryptography where each key is only known by the authentic source and one of the possible recipients, or by some other method, or some combination of the foregoing. The authentication mechanism for the distribution of the initial trusted bit string need not be as efficient as the simple authentication mechanism because it is used rarely (possibly only once in a device's lifetime) and can be used at a time when resource (CPU time, memory, bandwidth, etc.) constraints are less of a concern.

In a first illustrative embodiment, simple transmission authentication begins when a recipient receives a message via a communications interface, wherein the message comprises a single-use authentication token. The authentication token is the result of N−i applications of the hash function to the original secret random bit string. After receiving the authentication token, the recipient applies the hash function to the authentication token to generate a hash function result. If the hash function result does not match the recipient's stored trusted bit string (which would initially be the initial trusted bit string), then the recipient discards the received message. But if the hash function result matches the recipient's stored trusted bit string, then the recipient accepts the received message as authentic and may thereafter take some action in response to having received the authentic message. The recipient then stores the just-received authentication token as its new trusted bit string.

To account for situations where a message from a sender does not reach an intended recipient because of interference, error, or some other transmission failure, messages sent in some alternative embodiments could be repeatedly transmitted or, to cover the case where even multiple transmissions could fail, the messages may comprise both an authentication token and an iteration number, and the recipient can use the iteration number to determine how many times to apply the hash function to the just-received authentication token to generate the hash result for comparing with a stored trusted bit string.

One application employing this first illustrative embodiment might be, for example, a synchronization method. In the synchronization method, the recipient may receive a synchronization message comprising an authentication token. The recipient then authenticates the synchronization message by applying a secure hash function to the authentication token to generate a hash result, and comparing the hash result with a trusted bit string. The recipient may define a time point boundary between a first and second synchronization period based at least in part on the time that the authenticated synchronization message was received. To tolerate faulty message sources, a recipient could also receive synchronization messages from multiple sources and employ an algorithm to define the time point boundary between the first and second synchronization periods based at least in part on the different times that the authenticated synchronization messages were received. These methods would ensure that a plurality of recipients employing the authentication scheme could be synchronized with the source and with other recipients, immune to the threat of an adversary creating forged synchronization messages.

In another illustrative embodiment, the recipient maintains a plurality of separate trusted bit strings, such as two, at any given time. When the recipient receives a message comprising a first authentication token via a communications interface, the recipient applies the hash function to the authentication token to generate a hash result. If the hash result matches the first trusted bit string, then the recipient may (i) take a first action in response to having received the message, and (ii) store the first authentication token as the new first trusted bit string. If the hash result matches the second trusted bit string, then the recipient may (i) take a second action in response to having received the message, and (ii) store the first authentication token as the new second trusted bit string. In this illustrative embodiment, a match with either the first or second trusted bit string may denote some small amount of data, such as "on" or "off" or some similar designation. In one embodiment, control logic associated with the recipient may set one bit of a state machine to either a first or second logic value in response to the hash result matching the first or second bit string, respectively. It is understood that similar schemes employing multiple pairs of trusted bit strings could be used to encode other data messages. Moreover, the messages may indicate which of the multiple trusted strings to check so that recipients do not have to check multiple trusted bit strings.

In yet another illustrative embodiment, the method can be used to send encrypted data from a source to one or more recipients by specifying a window of time during which encrypted data corresponding to a particular key can be sent from the source to the one or more recipients. For example, a transmission of an authenticated message corresponds to the end of the time window in which messages may be encrypted in an encryption key that is identical to or derived from the authentication token in that authentication message. In this example, when the recipient receives an encrypted data message via a communications interface during the time window, it stores the encrypted message until the end of that time window is signaled by the reception of the authentication message for that window. When the authentication message comprising an authentication token is received via the communications interface, the recipient applies the hash function to the just-received authentication token to generate a hash result. If the hash result does not match the recipient's stored trusted bit string, then the recipient discards the message. But if the hash result matches the stored trusted bit string, then the recipient (i) decrypts the previously stored messages by using the just-received message's authentication token as a key (directly or indirectly) and (ii) replaces the trusted bit string with the just-received authentication token so that the just-received authentication token is the recipient's new trusted bit string. When the intended recipient has not received a valid authentication message within a certain time, it may discard all encrypted data messages for the missing authentication message. This time can be determined by a local time source in each intended recipient, or by the reception of an authentication message that has an iteration number and/or authentication token which are more than one step greater than those of the most recently accepted authentication message.

It is understood that this illustrative embodiment could also be implemented with multiple trusted bit strings, for example two trusted bit strings. In such an embodiment, the first trusted bit string could be used to designate the start of the transmission window while the second trusted bit string can be used to authenticate messages received during the pendency of the transmission window, by supplying the authentication token from which the decryption key can be derived, though many additional examples are possible as well.

In one embodiment, the above-described synchronization scheme may be combined with the above-described data encryption scheme such that a message may be used for both synchronization and for decrypting encrypted data receiving during a specified period of time. In this embodiment, using the same message for synchronization and decryption is advantageous because it uses less bandwidth and computing resources than methods that rely on separate messages for synchronization and decryption.

To account for situations where the source must send more than N messages to the recipients, some illustrative embodiments comprise sending a new initial trusted bit string via an encrypted message. Such an illustrative embodiment could be used for an application where it is undesirable to have the source either (i) perform a large number of hash functions for each transmission or (ii) store a long list of hash function results for use with transmission.

DETAILED DESCRIPTION OF THE DRAWINGS

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the reference is not limited hereto. The drawings included and described herein are illustrative and are not limiting the scope of the invention.

Furthermore, the terms first, second and the like in the description are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The term "comprising" used in the description should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof.

Illustrative embodiments of the invention will now be described by a detailed description of drawings depicting said embodiments. It is clear that other embodiments of the invention can be configured according to the knowledge of persons skilled in the art without departing from the true spirit or technical teaching of the invention.

Figure 1:
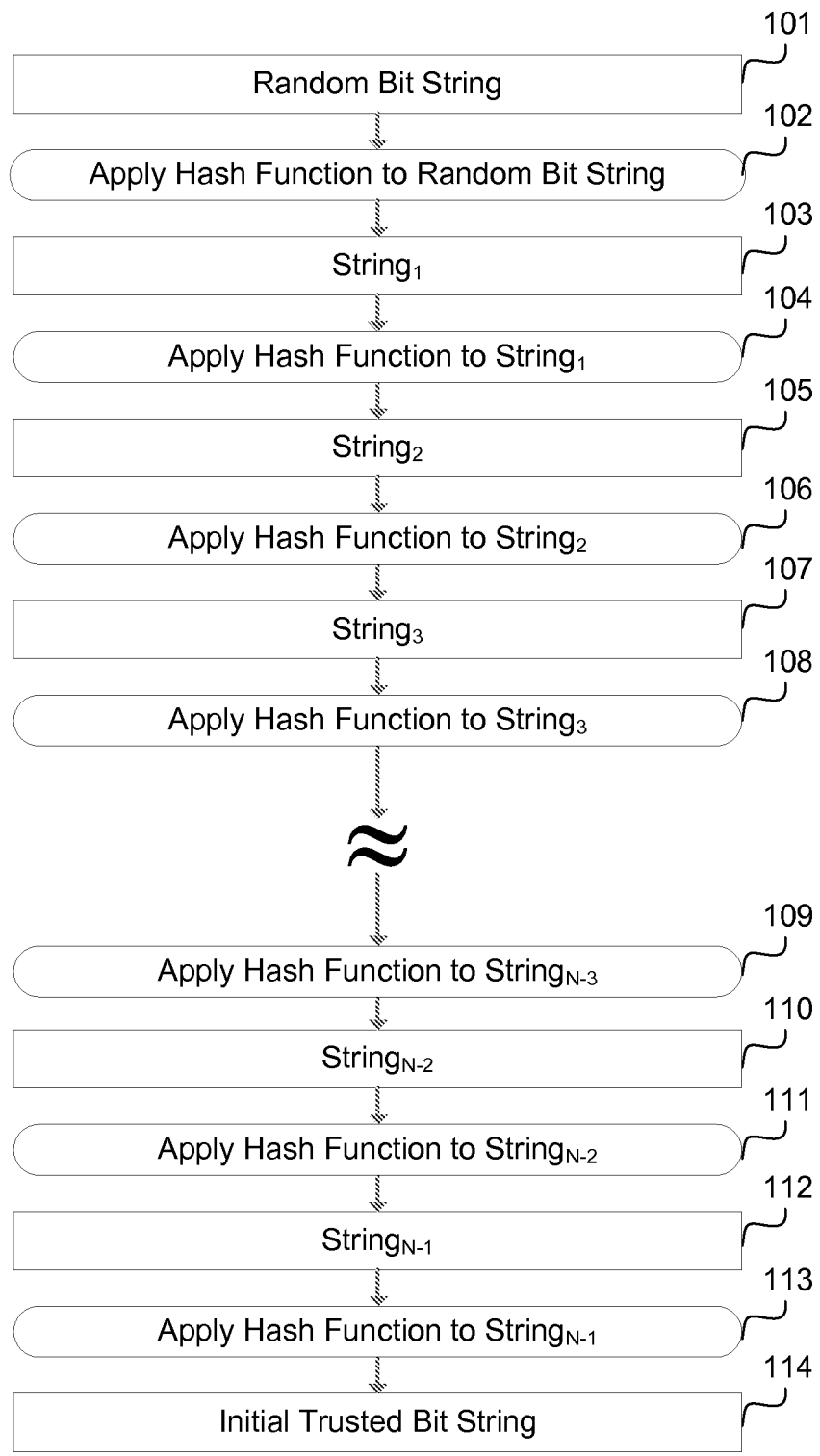
FIG. 1 depicts a known method for generating a trusted bit string.

FIG. 1 depicts a known method for generating a trusted bit string. A secure hash function is applied to an original secret random bit string 101 N times to produce an initial trusted bit string 114. In step 102, the hash function is applied to the original secret random bit string 101 to generate a first string 103. In step 104, the hash function is applied to the first string 103 to generate a second string 105. In step 106, the hash function is applied to the second string 105 to generate a third string 107, and so on until step 113 where the hash function is applied to string N−1 to generate the initial trusted bit string 114. The initial trusted bit string 114 generated by this process can be distributed to all anticipated recipients of a particular source. This initial trusted bit string 114 can be distributed through a number of secure methods that provide authentication, including a direct physical connection, secure transmission, etc.

Figure 2:
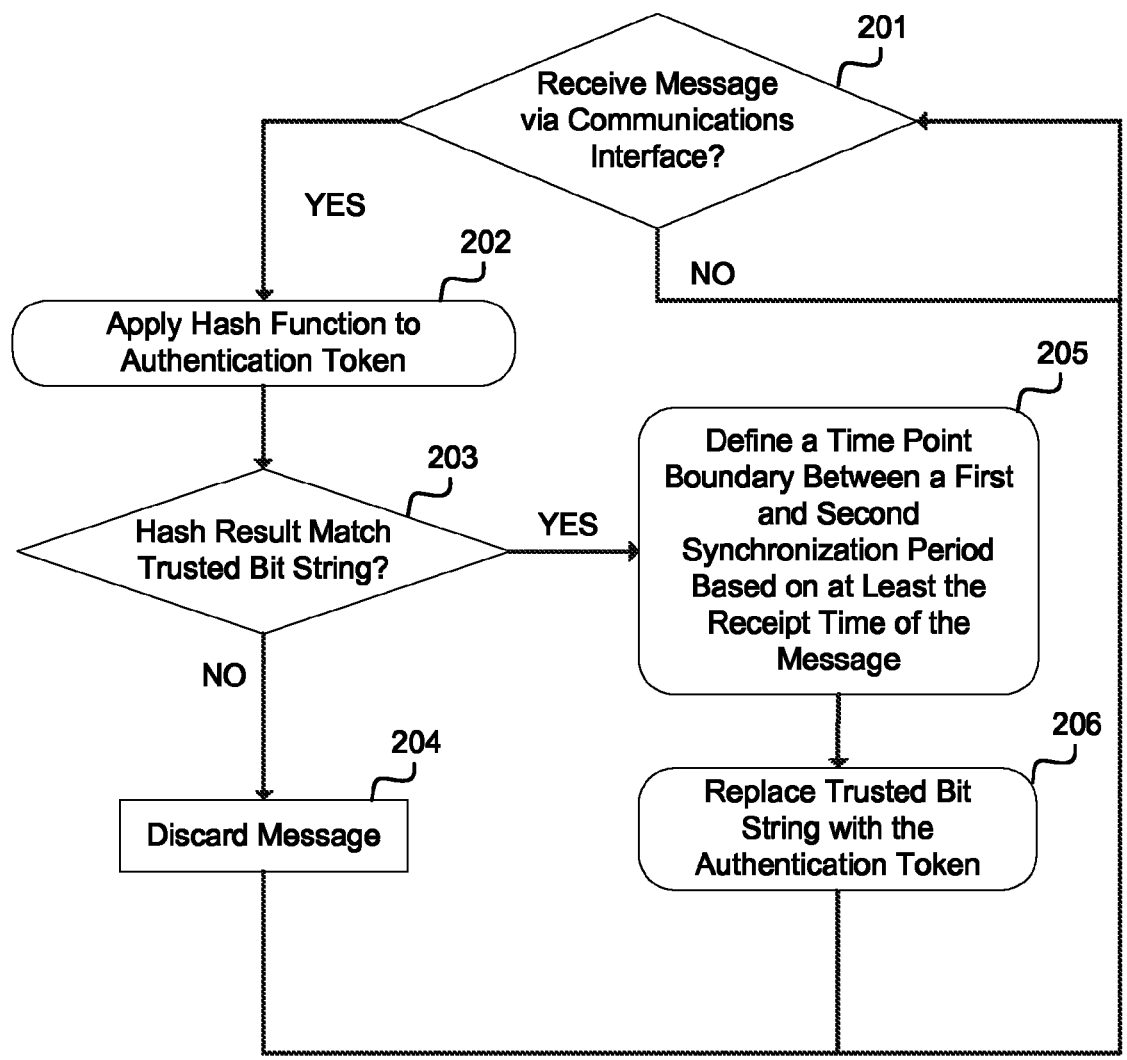
FIG. 2 depicts a method for using authenticated messages in a synchronization scheme, in accordance with illustrative embodiments.

FIG. 2 depicts a method for using authenticated messages in a synchronization scheme, according to one illustrative embodiment. At step 201, a synchronization message is received at a communications interface. The synchronization message comprises an authentication token which is the result of N−i applications of the hash function to the original secret random bit string. At step 202, the recipient applies the hash function to the authentication token to generate a hash result. At step 203, the recipient determines if the hash result matches a trusted bit string (which would initially be the initial trusted bit string 114). If the hash result does not match the trusted bit string, then the recipient discards the message at step 204. But if the hash result matches the trusted bit string, then at step 205, the recipient defines a time point boundary between a first and a second synchronization period based at least in part on the time that the synchronization message was received. Then, at step 206, the recipient replaces the trusted bit string with the just-received authentication token such that the just-received authentication token then becomes the new trusted bit string for the next hash result comparison. In this manner, the recipient uses the previously-received authentication token as the trusted bit string for authenticating the next synchronization message, so that when the next synchronization message is received, the recipient can apply the hash function to the synchronization message's authentication token to see whether the hash result matches the previously-received authentication token, to determine whether the new synchronization message is authentic. Because disrupting network synchronization can degrade or interrupt network service, the method shown in FIG. 2 is advantageous because it prevents the recipient from relying on synchronization messages sent from non-authentic senders.

In a first alternative embodiment of the method depicted in FIG. 2, a recipient may use multiple synchronization messages received from multiple sources for synchronization. In this first alternative embodiment, the recipient receives a set of synchronization messages, where each synchronization message in the set is associated with a unique sender, and where each synchronization message comprises an authentication token for comparison with a corresponding trusted bit string associated with the sender.

The association between the unique sender and the synchronization message could be accomplished in a number of ways. For example, the synchronization message could comprise both an authentication token and a sender identifier. Many popular communication protocols already include a sender identifier in their messages. Alternatively, the association between sender and synchronization message could be accomplished by knowing the network path that connects each sender with each recipient, such as, (i) in a fully connected network where every sender has a direct connection to every recipient, (ii) a network where a switch connects each sender to each recipient, (iii) in a network where the senders and recipients are connected via a high integrity ring network, and where the synchronization message comprises both an authentication token and a field that counts the number of ring nodes the synchronization message has traversed, or (iv) in a high integrity mesh network where each synchronization message's path is known a priori and enforced, or where each message accumulates information designating the path it took while in transit. The association between the sender and the synchronization message could also be accomplished by (i) assigning each sender a particular timeslot in a time division multiplexed network, (ii) assigning each sender a particular frequency in a frequency division multiplexed network, or (iii) assigning each sender a particular code in a code division multiplexed network.

In this first alternative embodiment of the method shown in FIG. 2, the recipient applies the hash function to the authentication token of each received synchronization message to generate a corresponding hash result for each authentication token. The recipient then compares each hash result with its corresponding trusted bit string. Then, the recipient defines the time point boundary between the first and second synchronization periods based on the time that the recipient received each synchronization message whose corresponding hash result matched its corresponding bit string. For the determination of the time point boundary, the recipient does not use any received message whose corresponding hash result did not match its corresponding bit string. In this manner, the recipient only uses authenticated synchronization messages for determining the time point boundary between the first and second synchronization periods.

In this embodiment, the recipient may use any of a number of methods to determine the time point boundary based on the multiple receipt times. For example, the recipient could (i) average the receipt times, (ii) average a subset of the receipt times, (iii) pick one receipt time out of the set of receipt times (such as the message with the median arrival time), (iv) determine a time based on weights assigned to senders or receipt times, or (v) other similar methods. In addition to preventing the recipient from relying on synchronization messages from non-authentic senders, this first alternative embodiment has the additional advantage of improving synchronization accuracy because it can use a algorithm to eliminate the effects of faulty synchronization message sources (sources that send synchronization messages at wrong times) when determining the time point boundary between the first and second synchronization periods.

In a second alternative embodiment of the method of FIG. 2, a recipient may further utilize a synchronization message window. A synchronization message window is defined as a period of time during which a synchronization message must be received to be used for defining the time point boundary between two synchronization periods. In this embodiment, the recipient receives a set of synchronization messages, where each synchronization message comprises an authentication token for comparison with a trusted bit string associated with the sender, and where each authentication token is associated with a synchronization message window. The recipient then applies the hash function to each received authentication token to generate a corresponding hash result for each received synchronization message. Then, the recipient determines (i) whether each received synchronization message was received during the synchronization message window associated with the message's authentication token, and (ii) whether each received synchronization message's corresponding hash result matches its corresponding trusted bit string. Next, the recipient defines the time point boundary between the first and second synchronization periods based on the receipt times of each received synchronization message (i) whose corresponding hash result matched its corresponding trusted bit string and (ii) that was received during the synchronization message window associated with that message's authentication token.

In some embodiments of the method of FIG. 2, a recipient may receive multiple copies of a synchronization message having the same authentication token. A sender may transmit multiple copies of a synchronization message to ensure that the intended recipient receives at least one of the multiple messages. When the recipient receives multiple synchronization message copies having the same authentication token, the recipient may define the time point boundary between the first and second synchronization periods based on the first time that it received an authenticated synchronization message copy, and the recipient may simply ignore subsequently received copies of the synchronization message.

In some embodiments of the method shown in FIG. 2, the received synchronization message may further comprise an iteration number. The iteration number may correspond to the total number of times that the hash function was applied to the original secret random bit string to create that message's authentication token. In this embodiment, the recipient determines the number of times to apply the hash function to the received authentication token based on the iteration number, and then applies the hash function to the received authentication token based on the determined number times to generate the hash result.

Figure 3:
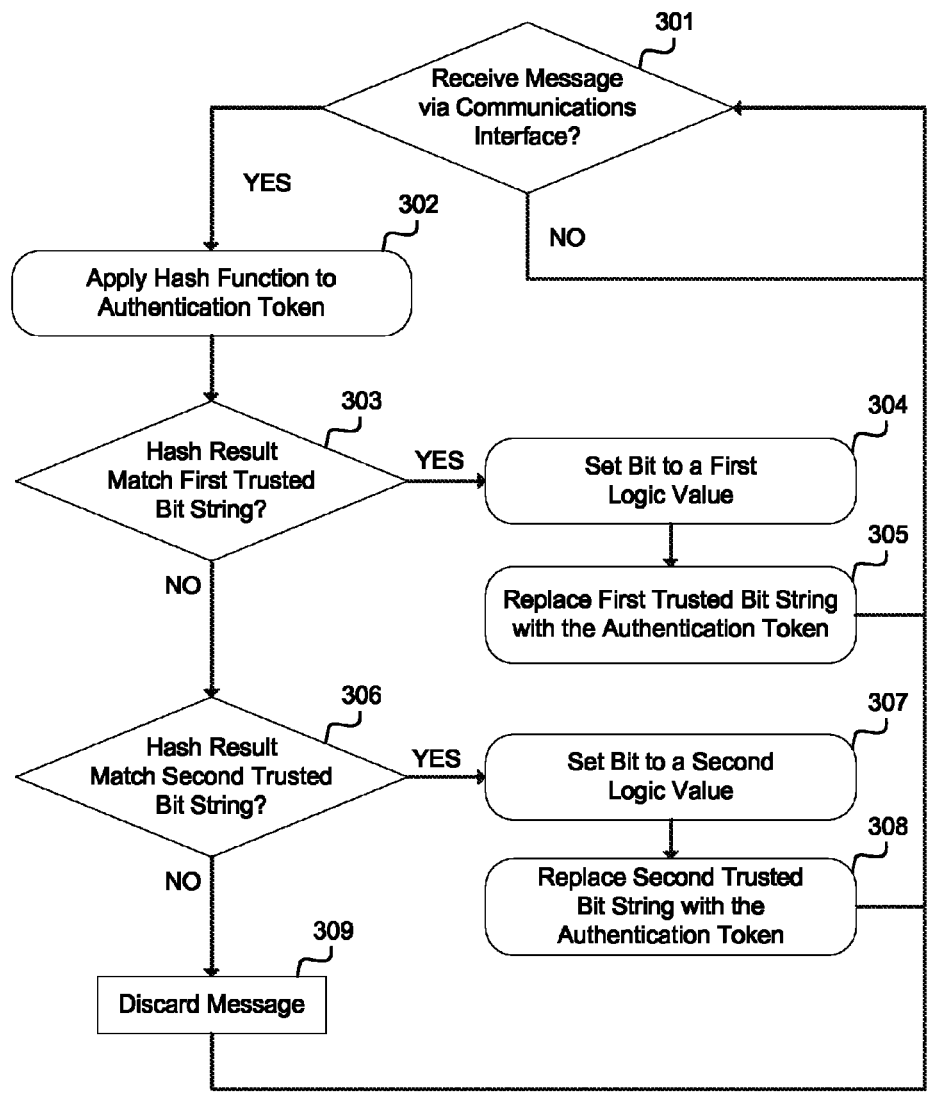
FIG. 3 depicts a method for using authenticated messages with multiple trusted bit strings to set a bit to one of two logic values, in accordance with illustrative embodiments.

FIG. 3 depicts a method for using authenticated messages with two trusted bit strings to set a bit to one of two logic values according to one illustrative embodiment. The method shown in FIG. 3 can be used for setting a state machine to one of two states, or for toggling a switch between first and second positions.

At step 301, a recipient receives a message via a communications interface. The message comprises an authentication token which is the result of N−i applications of the hash function to the original secret random bit string. At step 302, the recipient applies the hash function to the authentication token of the just-received message to generate a hash result. At step 303, the recipient determines if the hash result matches a first trusted bit string. If the hash result matches the first trusted bit string, then the recipient (i) sets a first bit to a first logic value at step 304 and (ii) replaces the first trusted bit string with the authentication token of the just-received message at step 305.

If the hash result does not match the first trusted bit string, the recipient determines if the hash result matches a second trusted bit string at step 306. If the hash result does not match the second trusted bit string, then the message is discarded at step 309. But, if the hash result matches the second trusted bit string, then the recipient (i) sets the first bit to a second logic value at step 307, and (ii) replaces the second trusted bit string with the authentication token of the just-received message at step 308.

The embodiment shown in FIG. 3 relies on matching a single authentication token's corresponding hash result with one of two trusted bit strings, where a match with the first trusted bit string corresponds to a first logic value, and a match with the second trusted bit string corresponds to a second logic value. However, applications are envisioned that may use a single authentication token with more than two trusted bit strings. For example, a single authentication token's corresponding hash result may be compared with three trusted bit strings to determine which of the three strings match the hash result, where a match with each different trusted bit string corresponds to one of three states, such as, for example, "high," "medium," or "low." Similarly, four trusted bit strings could be used to designate four exclusive states (or outcomes), and five trusted bit strings could be used to designate five exclusive states (or outcomes).

A first alternative embodiment of the method depicted in FIG. 3 utilizes messages comprising multiple authentication tokens (such as two in this embodiment), wherein each authentication token is used with a set of trusted bit strings, and where the recipient uses multiple sets of trusted bit strings for setting multiple individual bits to different logic values. In this alternative embodiment, the recipient receives a message comprising a first authentication token and a second authentication token. Each of the first and second authentication tokens correspond to a set of trusted bit strings, for example, the first authentication token corresponds to a first set of trusted bit strings comprising a first and second trusted bit string, and the second authentication token corresponds to second set of trusted bit strings comprising a third and fourth trusted bit string.

For the first authentication token, the recipient (i) applies the hash function to the first authentication token to generate a first hash result, (ii) compares the first hash result to the first trusted bit string and the second trusted bit string, (iii) sets the first bit to a first logic value and replaces the first trusted bit string with the first authentication token if the first hash result matches the first trusted bit string, and (iv) sets the first bit to the second logic value and replaces the second trusted bit string with the first authentication token if the first hash result matches the second trusted bit string.

For the second authentication token, the recipient (i) applies the hash function to the second authentication token to generate a second hash result, (ii) compares the second hash result to the third trusted bit string and the fourth trusted bit string, (iii) sets the second bit to the first logic value and replaces the third trusted bit string with the second authentication token when the second hash result matches the third trusted bit string, and (iv) sets the second bit to the second logic value and replaces the fourth trusted bit string with the second authentication token when the second hash result matches the fourth trusted bit string.

In this first alternative embodiment of the method shown in FIG. 3, the recipient may discard the received message when either (i) the first hash result does not match one of the first trusted bit string or the second trusted bit string or (ii) the second hash result does not match one of the third trusted bit string or the fourth trusted bit string.

In some embodiments, it may be desirable to set a maximum (max) iteration number that an iteration number associated with a received authentication token must not equal or exceed. Recall from the discussion of FIG. 1 that an initial trusted bit string is generated by applying a hash function to an original secret random bit string N number of times. Recall further that the hash result of the $i^{th}$ authentication token will match a trusted bit string that is the result of N−i+1 applications of the hash function to the original secret random bit string, when the $i^{th}$ authentication token is the result of (N−i) applications of the hash function to the original secret random bit string. In this manner, (N−i) is the iteration number associated with the authentication token, and i corresponds to the maximum number of authentication tokens (including the current authentication token) that may have been sent by the sender whose hash result has (or will, in the case of the current authentication token) match the trusted bit string at the time the authentication token was (or is) received. The message received from the sender may include an iteration number or the recipient could determine the iteration number associated with a particular authentication token by trial and error (e.g., repeatedly applying the hash function to the authentication token until the result matches the trusted bit string).

In a second alternative embodiment of the method shown in FIG. 3, the recipient receives a message comprising a first authentication token. Then, the recipient applies the hash function to the first authentication token at least one time to generate the first hash result. The recipient then (i) determines whether the first hash result matches the first trusted bit string and (ii) determines whether the iteration number associated with the first authentication token is less than a current max iteration number. If both conditions are satisfied (i.e., if the hash result of the first authentication token matches the first trusted bit string and the iteration number associated with the first authentication token is less than the current max iteration number), then the recipient updates the current max iteration number with the iteration number associated with the first authentication token. If the first hash result does not match the first trusted bit string, then the recipient (i) determines whether the first hash result matches the second trusted bit string and (ii) determines whether the iteration number associated with the first authentication token is less than the current max iteration number. If both conditions are satisfied (i.e., if the hash result of the first authentication token matches the second trusted bit string and the iteration number associated with the first authentication token is less than the current max iteration number), then the recipient replaces the second trusted bit string with the first authentication token, and updates the current max iteration number with the iteration number associated with the first authentication token.

A more complex alternative embodiment of the method shown in FIG. 3 may use two authentication tokens and two sets of trusted bit strings (each set having two trusted bit strings). In this embodiment, the recipient receives a message comprising a first and a second authentication token. To find a match for the first authentication token, the recipient applies the hash function to the first authentication token at least one time to generate the first hash result, and then (i) determines whether the first hash result matches one of either the first trusted bit string or the second trusted bit string, and (ii) determines whether the iteration number associated with the first authentication token is less than the current max iteration number. If both conditions are satisfied (i.e., if the hash result of the first authentication token matches the first or second trusted bit string and the iteration number associated with the first authentication token is less than the current max iteration number), then the recipient replaces the matching trusted bit string with the first authentication token. To find a match for the second authentication token, the recipient applies the hash function to the second authentication token at least one time to generate the second hash result, and then (i) determines whether the second hash result matches one of either the third trusted bit string or the fourth trusted bit string, and (ii) determines whether the iteration number associated with the second authentication token is less than the current max iteration number. If both conditions are satisfied (i.e., if the hash result of the second authentication token matches the third or fourth trusted bit string and the iteration number associated with the second authentication token is less than the current max iteration number), then the recipient replaces the matching trusted bit string with the second authentication token and replaces the max iteration number with the second authentication token's iteration number. In embodiments where the first and second authentication tokens have the same iteration number and either token successfully matched a trusted string, the recipient updates the max iteration number with the iteration number associated with the first and second authentication tokens. In embodiments where the first and second authentication tokens have different iteration numbers and either token successfully matched a trusted string, the recipient updates the max iteration number with the lesser of (i) the iteration number associated with the first authentication token or (ii) the iteration number associated with the second authentication token Enforcing the above-described max iteration number requirement for authentication tokens could prevent a situation where a rouge actor intentionally delays valid messages intended for the recipient for the purpose of disrupting the recipient's operation. Such a situation could occur for an embodiment employing two authentication tokens and two sets of trusted bit strings (where each set has two trusted bit strings) when: (i) a sender sends a first message with two authentication tokens whose hash results will match the first and third trusted bit strings, respectively (thus encoding a binary "01" message); (ii) a rouge actor intercepts a second message from the sender, records the message, and prevents the message from being delivered to the recipient, where the second message had two authentication tokens whose hash results would have matched the second and fourth trusted bit strings (which would have been a binary "10" message to the recipient); and (iii) the sender sends a third message with two authentication tokens whose hash results will match the first and third trusted bit strings again (encoding a binary "01" message again). If the max iteration number requirement is not enforced, the rouge actor could retransmit the captured second message to send the "10" message to the recipient and thus disrupt the recipient's operation by causing the recipient to receive the second and third messages out of order. But if the max iteration number requirement is enforced, then all messages must be received in the order in which they were sent from the sender, thus preventing the case where a rogue actor disrupts the actions of the recipient by delaying or reordering the transmission of valid messages as described above.

The above-described embodiments of the method depicted in FIG. 3 may be used for setting bits in a state machine controller. Alternatively, a more complicated variant of the above-described method may utilize a message with perhaps four, eight, or sixteen authentication tokens, where each authentication token corresponds to one bit of an entry in an index of actions that the recipient might be programmed to perform. Moreover, the disclosed embodiments are not limited to binary programming. In particular, instead of using two trusted bit strings per set to communicate a "high" and "low" binary value, the method could employ three trusted bit strings per set to communicate a "high," "medium," and "low" setting. Similarly, different sets of trusted bit strings may have different quantities of trusted bit strings. For example, a first set of trusted bit strings could have two trusted bit strings while a second set of trusted bit strings could have three trusted bit strings. Those skilled in the art will readily know how to adapt the above-described system for use with sets having multiple trusted bit strings for encoding different types of messages.

Figure 4:
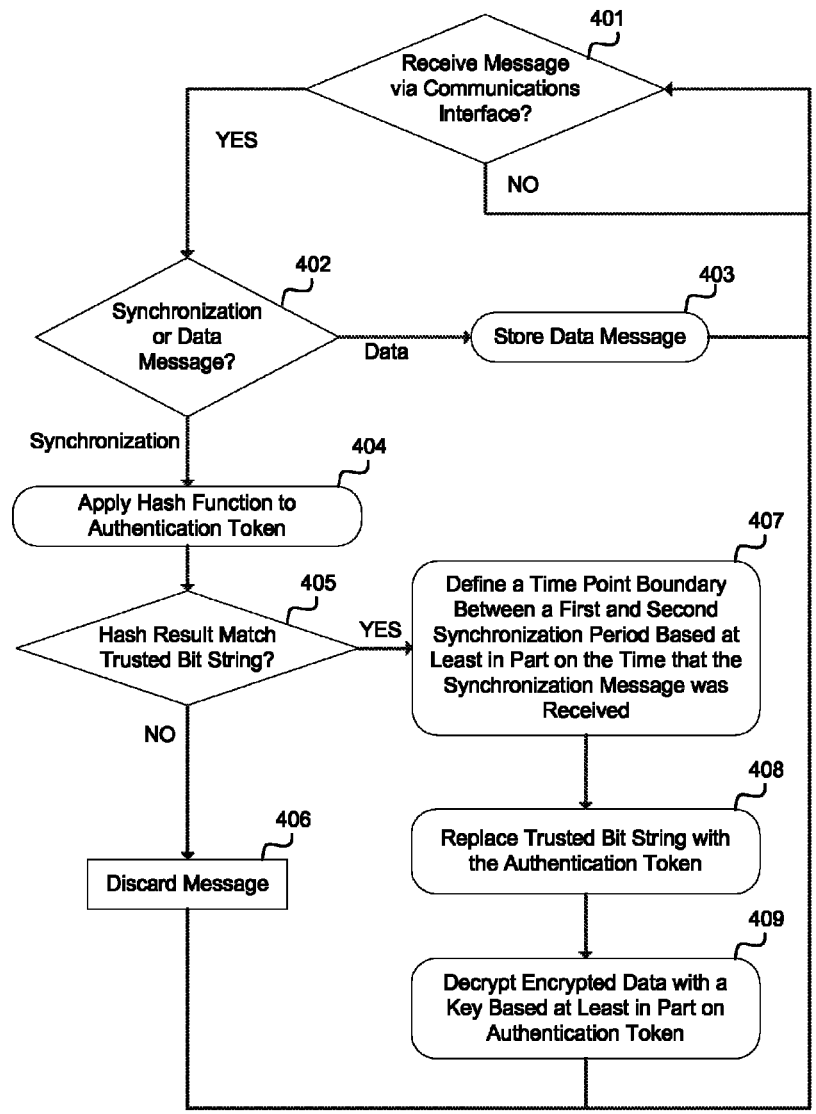
FIG. 4 depicts a method for using authenticated messages for synchronization and decryption, in accordance with illustrative embodiments.

FIG. 4 depicts a method for using authenticated messages for synchronization and decryption, according to one illustrative embodiment. Using authentication messages for both synchronization and decryption is advantageous because using synchronization messages for both synchronization and decryption uses less bandwidth and recipient computing resources than a scheme that may use different transmissions and different processes for synchronization and decryption. The encryption and decryption according to this method could be any cryptographic operation and its inverse that require a secret key. These operations could include those that provide secrecy (thus, providing a type of "time-lock" secrecy) or they could provide only authentication in the form of a message authentication code.

At step 401, the recipient receives a message via a communications interface. At step 402, the recipient determines whether the message is a data message or a synchronization message. If the message is a data message comprising encrypted data, then the recipient stores the data message at step 403 and returns to step 401 to await receipt of subsequent messages. If the message is a synchronization message comprising an authentication token, then the recipient proceeds to step 404. At step 404, the recipient applies a hash function to the authentication token of the just-received message at least one time to generate a hash result. At step 405, the recipient determines whether the hash result matches a corresponding trusted bit string. If the hash result does not match the corresponding trusted bit string, then the recipient discards the message at step 406. But if the hash result matches the trusted bit string, then at step 407, the recipient defines a time point boundary between a first and a second synchronization period based at least in part on the time that the synchronization message was received. Then, at step 408, the recipient replaces the trusted bit string with the just-received authentication token such that the just-received authentication token is now the new trusted bit string, and at step 409, the recipient decrypts the stored data messages from step 403 with a key derived at least in part from the just-received authentication token of the just-received authentic message.

In a first alternative embodiment of the method shown in FIG. 4, the recipient receives and stores at least one data message that comprises encrypted data. Then, the recipient receives a synchronization message comprising an authentication token. The recipient then applies the hash function to the authentication token to generate a hash result. Next, the recipient determines whether the hash result matches the trusted bit string corresponding to the hash result. When the hash result matches the trusted bit string, the recipient (i) defines a time point boundary between two synchronization periods, based at least in part on the time that the synchronization message was received, (ii) replaces the corresponding trusted bit string with the authentication token, and (iii) decrypts the encrypted data with a decryption key based at least in part on the authentication token.

A second alternative embodiment of the method depicted in FIG. 4 may utilize a synchronization message window. As discussed, a synchronization message window is defined as a period of time during which a synchronization message must be received to be used for defining the time point boundary between two synchronization periods. In this embodiment, the recipient may ignore data messages that are received during a synchronization window. In an example where a synchronization message whose authentication token will be used to decrypt data in a particular data message, the recipient may ignore the data message if the recipient receives the data message at a time that is after the start of the synchronization window during which the recipient expects to receive the synchronization message comprising the authentication token to be used for decrypting the encrypted data in the data message. In another example, the recipient may ignore a data message if the data message is received at a time that is not during the synchronization period immediately preceding the synchronization message window during which the recipient expects to receive the synchronization message comprising the authentication token to be used for decrypting the encrypted data in the data message. In yet another example, the recipient may use a synchronization message for both synchronization and decryption when the synchronization message is received during its expected synchronization window, but the recipient may use the synchronization message only for decryption when the synchronization message is not received during its expected synchronization window.

In a fourth alternative embodiment of the method shown in FIG. 4, the encrypted data may comprise a new trusted bit string. In this embodiment, the recipient may receive new bit strings for use in determining whether received synchronization messages are from authentic senders.

ENVISIONED APPLICATIONS

Many applications of the aforementioned illustrative embodiments are envisioned. Apart from providing authentication and/or integrity for synchronization schemes, data encryption, and control systems, another advantage of using simple authenticated messages is that systems implementing such a scheme can be manufactured at a very low cost and can operate at very low power levels, due primarily to the simplicity of the scheme. Thus, they are ideal for implementation in distributed real-time embedded systems.

One application of a synchronization scheme according to one illustrative embodiment includes synchronization messages used in connection with efficient encryption algorithms and protocols designed for resource constrained applications, such as the algorithm components disclosed and described in U.S. Pat. Nos. 6,760,440; 6,763,363; 6,804,354; 7,277,543; and their related pending applications, which are hereby incorporated by reference in their entirety. In such an application, the timeframe for crypto-analysis can be limited to a discrete time-window where the crypto-analysis key changes for each window, thus making decoding of intercepted messages extremely difficult for adversarial entities. Other applications of the disclosed authentication scheme in the context of encryption methods and protocols such as those incorporated above will be apparent to those skilled in the art.

Other applications of the synchronization scheme include enabling a sending device to synchronize a plurality of remote devices with one another. This may be useful when a plurality of remote devices must work together in a synchronized fashion to control a large distributed system, such as an electrical power grid, a petro-chemical pipeline system, a communications network, or other system of devices that require synchronized interworking.

One application of using the simple authentication messages to encode control messages according one illustrative embodiment includes a system for controlling consumer devices connected to a power grid. For example, an electric utility company may provide consumers with discounted electrical rates in exchange for the consumer granting the electric utility company some amount of control over the consumer's household electrical devices. In this manner, the electric utility may send a message to power off certain air conditioning units over a specific geographic region for a defined period of time so as to conserve electricity. The message may be sent, for example, via a satellite or other wireless interface, via a landline communications interface, or via a power-line communications interface. The use of secure authenticated messages to control such a system would prevent a computer hacker or other rouge user from sending messages to power-cycle multiple systems en-masse so as to disrupt the electrical power grid.

Another application envisioned includes a system for securely controlling the opening and closing of valves in a petro-chemical pipeline. In this manner, the pipeline operator can use secure authenticated messages to control the flow of chemicals and/or gasses through a large interconnected network of pipes. The messages may be sent, for example, via a satellite or other wireless interface, a landline communications interface, or a power-line communications interface.

Another application envisioned includes a system for arming and disarming warheads or mines. For example, a military user may desire a means for maintaining warheads in a "disarmed" state for transportation and deployment, whereupon after deployment, the warhead can be placed into an "armed" state, and thereafter, either "detonated" or "disarmed" by means of a simple authenticated message. The use of secure authenticated messages to control such a warhead would prevent enemy counter-measures that might include sending "disarm" messages to a warhead once deployed or sending an "arm" or "detonate" message to a warhead while still in storage or transportation. Similarly, it would allow for warheads to be "disarmed" after deployment by a military operator for safe removal. Additionally, arming could require multiple authentication messages from multiple sources.

Another application envisioned includes management of secure facilities. For example, a sender can remotely grant access to a secure facility by sending a "grant" message a door-lock controlled by a system according to one embodiment. The use of secure authenticated messages to control such a system could increase the physical security of a facility by vesting the access authorization in a centralized control center wherein control signals to grant access are sent via the simple authenticated message.

Many of the above-described applications may employ a network system, where one or more of the network nodes are configured to send messages to other network nodes, and where one or more of the network nodes are configured to receive messages and perform the steps of the methods described herein. Additionally, any of the disclosed methods could also be embodied on a computer readable media containing instructions to cause a processor associated with the recipient to perform the disclosed methods. Exemplary computer readable media and processors configured to execute program code held therein are well known in the art.

I claim:

1. A method comprising:
   receiving, by a computing device, a set of at least two synchronization messages, wherein each synchronization message of the at least two synchronization message comprises a respective authentication token for comparison with a respective corresponding trusted bit string associated with the respective unique sender;
   applying, by the computing device, a hash function to the authentication token of each received synchronization message of the set at least one time to generate a corresponding hash result for each received synchronization message;
   determining, by the computing device, whether the hash result for each received synchronization message matches the corresponding trusted bit string for the unique sender associated with the received synchronization message;
   defining, by the computing device, a time point boundary between a first time synchronization period and a second time synchronization period using a value that is determined based at least in part on receipt times of each received synchronization message of the set whose corresponding hash result matched its corresponding trusted bit string; and
   for each received synchronization message whose respective corresponding hash result matched its respective corresponding trusted bit string, replacing, by the computing device, the corresponding trusted bit string with the corresponding authentication token of the received synchronization message, wherein the unhashed authentication token replaces the corresponding trusted bit string.

2. The method of claim 1, wherein each authentication token is associated with a synchronization message window, wherein the synchronization message window is a period of time during which a synchronization message must be received to be used for defining the time point boundary between two synchronization periods, and wherein the method further comprises:
   determining whether each received synchronization message of the set was received within the synchronization message window associated with the authentication token of the received synchronization message;
   defining the time point boundary between the first and second synchronization periods based on the receipt times of each received synchronization message whose corresponding hash result matched its corresponding trusted bit string and which was received within the synchronization message window associated with that message's authentication token; and
   for each synchronization message whose corresponding hash result matched its corresponding trusted bit string, replacing the corresponding trusted bit string with the corresponding authentication token of the received synchronization message.

3. The method of claim 1, wherein when multiple copies of a synchronization message having the same authentication token are received, the method further comprises:
   defining the time point boundary between the first and second synchronization periods based on the time that the first copy of the synchronization message is received; and
   ignoring subsequently received copies of the synchronization message.

4. The method of claim 1, further comprising
   receiving and storing at least one data message, wherein the at least one data message comprises encrypted data;
   receiving a second synchronization message of the set after receiving the at least one data message, wherein the second synchronization message comprises a second authentication token;
   applying the hash function to the second authentication token at least one time to generate a second hash result; and
   determining whether the second hash result matches the trusted bit string corresponding to the hash function, and when the second hash result matches the corresponding trusted bit string, then (i) defining a time point boundary between the second synchronization period and a third synchronization period based at least in part on the time that the second synchronization message was received, (ii) replacing the corresponding trusted bit string with the second authentication token, and (iii) decrypting the encrypted data with a decryption key based at least in part on the second authentication token.

5. The method of claim 4, wherein the second synchronization message is received at a time during a synchronization message window, and wherein the method further comprises:
   ignoring the at least one data message when the at least one data message is received at time after the start of the synchronization message window.

6. The method of claim 4, wherein the second synchronization message is received at a time during a synchronization message window, and wherein the method further comprises:
   ignoring the at least one data message when the at least one data message is received at time that is either (i) not during the first synchronization period, or (ii) after the start of the synchronization message window.

7. The method of claim 4, further comprising:
   determining whether the second synchronization message has been received at a time during the synchronization message window; and when the second synchronization message is received at a time during the synchronization message window, then (i) defining the time point boundary between the second synchronization period and the third synchronization period based at least in part on the time that the second synchronization message was received, and (ii) decrypting the encrypted data with a decryption key based at least in part on the second authentication token; and when the second synchronization message is received at a time after the end of the synchronization message window, then decrypting the encrypted data with a decryption key based at least in part on the second authentication token.

8. The method of claim 1, wherein the received synchronization messages further comprise iteration numbers, and wherein the method further comprises:

determining a number of times to apply the hash function to the received respective authentication tokens based on the iteration numbers; and applying the first hash function to the received authentication token the respective determined number of times to generate the corresponding hash result.

9. The method of claim 4, wherein the encrypted data comprises a new first trusted bit string, and wherein the method further comprises replacing at least one of the trusted bit strings with the new first trusted bit string.

10. The method of claim 1, wherein the value that is based at least in part on the multiple receipt times of each received synchronization message further comprises at least one of:
an average of the receipt times;
an average of a subset of the receipt times;
a receipt time selected from the receipt times; and
a weighted value that is based at least in part on applying at least one weight to at least one receipt time of the multiple receipt times, wherein the at least one weight is associated with at least one of the unique senders or a receipt time of at least one of the unique senders.

11. A method comprising:
receiving, by a computing device, a first message and a second message from a sender, the first and second messages each comprising a first authentication token and a second authentication token that are each associated with the sender, and wherein each of the first and second authentication tokens is comparable with multiple trusted bit strings associated with the sender;
applying a hash function to the first authentication token at least one time to generate a first hash result;
determining whether the first hash result matches a first trusted bit string of the multiple trusted bit strings;
when the first hash result matches the first trusted bit string, then (i) setting a first bit to a first logic value, wherein the first bit corresponds to one of a state machine and an entry in an index of actions, and (ii) replacing the first trusted bit string with the first authentication token, wherein the unhashed first authentication token replaces the first trusted bit string;
when the first hash result does not match the first trusted bit string, then determining whether the first hash result matches a second trusted bit string of the multiple trusted bit strings; and
when the first hash result matches the second trusted bit string, the (i) setting the first bit to a second logic value, and (ii) replacing the second trusted bit string with the first authentication token, wherein the unhashed first authentication token replaces the second trusted bit string.

12. The method of claim 11, further comprising:
discarding the first message when the first hash result does not match one of either the first trusted bit string or the second trusted bit string.

13. The method of claim 11, wherein the received first message further comprises a third authentication token, wherein the first authentication token is associated with the first bit, and wherein the third authentication token is associated with a second bit, and wherein the method further comprises:
applying the hash function to the third authentication token at least one time to generate a second hash result;
determining whether the second hash result matches a third trusted bit string of the multiple trusted bit strings corresponding to the sender of the first message;
when the second hash result matches the third trusted bit string, then (i) setting the second bit to the first logic value, and (ii) replacing the third trusted bit string with the second authentication token;
when the second hash result does not match the third trusted bit string, then determining whether the second hash result matches a fourth trusted bit string of the multiple trusted bit strings corresponding to the sender of the first message; and
when the second hash result matches the fourth trusted bit string, then (i) setting the second bit to the second logic value, and (ii) replacing the fourth trusted bit string with the second authentication token.

14. The method of claim 13, further comprising:
discarding the first message when either (i) the first hash result does not match one of either the first trusted bit string or the second trusted bit string, or (ii) the third hash result does not match one of either the third trusted bit string or the fourth trusted bit string.

15. The method of claim 11, wherein determining whether the first hash result matches the first or second trusted bit strings further comprise determining whether an iteration number associated with the first authentication token is less than a current max iteration number, and wherein the method further comprises:
updating the current max iteration number with the iteration number associated with the first authentication token when (i) the first hash result matches the first or second trusted bit string and (ii) the iteration number associated with the first authentication token is less than the current max iteration number.

16. The method of claim 15, wherein the current max iteration number equals the iteration number of a most recent authentication token (i) that was received prior to receiving the first authentication token, (ii) whose hash result matched one of either the first or second trusted bit strings, and (iii) whose iteration number was less than the previous max iteration number.

17. The method of claim 13, wherein determining whether the first hash result matches the first or second trusted bit strings further comprises determining whether an iteration number associated with the first authentication token is less than a current max iteration number, and wherein determining whether the second hash result matches the third or fourth trusted bit strings further comprise determining whether the iteration number associated with the third authentication token is also less than the current max iteration number, and wherein the method further comprises:
updating the current max iteration number when (i) the first hash result matches either the first or second trusted bit strings, and the iteration number associated with the first authentication token is less than the current max iteration number, or (ii) the second hash result matches either the third or fourth trusted bit strings, and an authentication token associated with the third authentication token is less than the current max iteration number; and wherein the current max iteration number is updated with the lesser of (i) the iteration number associated with the first authentication token or (ii) the iteration number associated with the third authentication token.

18. The method of claim 17, wherein the current max iteration number equals the lesser iteration number of the most recent authentication token (i) that was received prior to receiving the first message comprising the first and third authentication tokens, (ii) whose hash result matched any of the first, second, third, or fourth trusted bit strings, and (iii) whose iteration number was less than the previous max iteration number.

19. The method of claim 13 wherein the first and second bits correspond to bits of a state machine.

20. The method of claim 13 wherein the first and second bits correspond to bits of an entry in an index of actions.

* * * * *